(12) United States Patent
Nemecek

(10) Patent No.: US 6,922,821 B1
(45) Date of Patent: Jul. 26, 2005

(54) SYSTEM AND A METHOD FOR CHECKING LOCK STEP CONSISTENCY BETWEEN AN IN CIRCUIT EMULATION AND A MICROCONTROLLER WHILE DEBUGGING PROCESS IS IN PROGRESS

(75) Inventor: Craig Nemecek, Seattle, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 265 days.

(21) Appl. No.: 09/998,859

(22) Filed: Nov. 15, 2001

(51) Int. Cl.[7] ............................ G06F 17/50; G06F 9/44
(52) U.S. Cl. .............................. 716/4; 703/13; 703/14; 717/128
(58) Field of Search ............................ 716/4; 703/13, 703/14; 717/128

(56) References Cited

U.S. PATENT DOCUMENTS

| | | | | |
|---|---|---|---|---|
| 5,331,571 A | * | 7/1994 | Aronoff et al. ................. | 716/4 |
| 5,574,892 A | * | 11/1996 | Christensen ................. | 703/28 |
| 5,630,102 A | * | 5/1997 | Johnson et al. ............... | 703/28 |
| 5,758,058 A | * | 5/1998 | Milburn ....................... | 714/11 |
| 5,895,494 A | * | 4/1999 | Scalzi et al. ................. | 711/150 |
| 6,134,516 A | * | 10/2000 | Wang et al. .................. | 703/27 |
| 6,202,044 B1 | * | 3/2001 | Tzori .......................... | 703/28 |
| 6,581,191 B1 | * | 6/2003 | Schubert et al. ............... | 716/4 |
| 6,618,854 B1 | * | 9/2003 | Mann .......................... | 717/124 |
| 6,810,442 B1 | * | 10/2004 | Lin et al. ..................... | 710/22 |

OTHER PUBLICATIONS

Cypress Microsystems Unveils Programmable System–On–A–Chip for Embedded Internet, Communications and Consumer Systems, [online], [retrieved on Nov. 13, 2003]. Retrieved from the Internet<http://www.cypressmicro.com/corporate/CY_Announces_nov_13_2000.html>.*

Ing–Jer Huang et al., ICEBERG, An Embedded In–circuit Emulator Synthesizer for Microcontrollers, Proceedings of the 36th Design Automation Conference, pp. 580–585, Jun. 1999.*

Sungjoo Yoo et al., Fast Hardware–Software Coverification by Optimistic Execution of Real Processor, Proceedings of Design, Automation and Test in Europe Conference and Exhibition, pp. 663–668, Mar. 2000.*

"PSoC Designer: Integrated Development Environment" User Guide; Revision 1.11; CMS10005A; Last Revised: Jul. 17, 2001; Cypress MicroSystems, Inc.

Cypress Microsystems, Cypress Microsystems Unveils Programmable System–On–A–Chip for Embedded Internet, Communications and Consumer Systems, Nov. 13, 2000, http://www.cypressmicro.com/corporate/CY_Announces_nov_13_2000.html.

* cited by examiner

Primary Examiner—A. M. Thompson
(74) Attorney, Agent, or Firm—Murabito & Hao LLP

(57) ABSTRACT

Checking the consistency of a lock step process while debugging a microcontroller code is in progress. A method provides a production microcontroller to execute an instruction code and provides the result of the instruction code to an ICE. The ICE, independent from the production microcontroller and simultaneously, executes the same instruction code and produces a result. The ICE compares the result of its computation and the result received from the production microcontroller. The ICE issues a "lock step error" when the result of the comparison is a mismatch. A trace buffer residing in the host device provides the location of the line of code causing the mismatch. After identifying the line of code causing the mismatch the user debugs the erroneous line of code. The debugging process resumes on the next line of code in the microcontroller code under test.

25 Claims, 3 Drawing Sheets

SYSTEM AND A METHOD FOR CHECKING LOCK STEP CONSISTENCY BETWEEN AN IN CIRCUIT EMULATION AND A MICROCONTROLLER WHILE DEBUGGING PROCESS IS IN PROGRESS

FIELD OF INVENTION

This invention relates generally to the field of in circuit emulation (ICE). More specifically an embodiment of the present invention relates to a method and system for "lock step" consistency checking between an ICE and a production microcontroller while debugging of a microcontroller code is in progress.

BACKGROUND OF THE INVENTION

In circuit emulation (ICE) has been used by software and hardware developers for a number of years as a development tool to emulate the operation of complex circuit building blocks and permit diagnosis and debugging of hardware and software. Such in circuit emulation is most commonly used to analyze and debug the behavior of complex devices such as microcontrollers and microprocessors that have internal structures that are far too complex to readily model using computer simulation software alone.

FIG. 1 illustrates an exemplary conventional in-circuit emulation arrangement 100 used to model, analyze and debug the operation of a microcontroller device. In this arrangement, a host computer (e.g., a personal computer) 110 is connected to a debug logic 120 which is further connected to a special version of the microcontroller device that has been developed specially for use in emulation. Traditionally, a microcontroller manufacturer would manufacture two versions of any one of its microcontrollers, a special version and a production version. The special version of the microcontroller includes special testing hardware (e.g., scan chain, registers, and the like) for supporting software debugging functions. The special version is only used for the purpose of testing and debugging microcontroller code, where the debugged microcontroller code is eventually loaded in the production version of the same microcontroller to be marketed.

Debugging operation starts with the host computer 110 loading instructions through debug logic block 120 to the special version of the microcontroller 130 where the instructions are executed. Depending upon the application, this operation may be monitored while the special version of the microcontroller 130 is interconnected with the circuitry that is intended to interface a production version of the microcontroller in the finished product under development. Such interconnection -may be via simulation within the host computer 110 or as actual circuitry or some combination thereof. As the circuit is stepped through its operation, the debug logic gathers information about the state of various components of the microcontroller 130 during operation and feeds that information back to the host computer 110 for analysis.

During the course of the analysis, various trace information such as time stamps, register value, data memory content, etc., may be logged in the host computer 110 for analysis and debugging by the designer. Additionally, it is generally the case that various break points can be defined by the designer that cause the program to halt execution at various points in the operation to permit detailed analysis. Other debugging tools may also be provided to enable the user to debug the operation of the circuit.

Typically during the debugging process a designer would prefer to run the microcontroller in as much of a real world situation as possible. Therefore, a microcontroller is installed in a test circuit, which closely resembles the hardware that is to be controlled by the production version of the microcontroller under the test. It is appreciated that the term base station and ICE are used interchangeably herein.

As described above, ICE is a conventional technique for debugging a microcontroller code. A typical ICE includes a production microcontroller used for debugging purposes, a virtual copy of the production microcontroller, which exist in the base station unit, and a host device. The production microcontroller includes a memory, a CPU register, a SRAM, a program counter, and a file register. The host device copies a substantial part of the production microcontroller in the base station, which forms the virtual microcontroller. The base station also includes a memory, a CPU register, a SRAM, a program counter, and a file register.

Debugging process is initiated by software residing in the host device, which loads the microcontroller code in both production microcontroller and the virtual microcontroller. The Production microcontroller and the virtual microcontroller run the microcontroller code in a synchronized process. Synchronization of the microcontroller and the virtual microcontroller requires that the production microcontroller and the virtual microcontroller start running the microcontroller code at the same time, execute the same lines of code sequentially, and if there is a breakpoint in the microcontroller code or if a user halts the execution of the microcontroller code for any purpose, both production and virtual microcontroller encounter the command at the same time. Furthermore, synchronization requires that during the course of debugging the microcontroller code, after execution of each line of the microcontroller code, the memory, the CPU register, and SRAM of the virtual microcontroller and the memory, the CPU register, and SRAM of the production microcontroller have the same value. Furthermore, it is appreciated that the contents of the memory, the CPU register, and SRAM in the production microcontroller are not available to the user while the production microcontroller is executing a code.

Conventional methods used for debugging of a microcontroller code do not check the consistency of a debugging process on real time basis. However, a need exists to ensure the integrity of a synchronized execution of the debugging process while a microcontroller program is being debugged. Furthermore, a need exists to check the consistency of the synchronized debugging process when the production microcontroller and the virtual microcontroller hit a break point or when a user halts the debugging process for any reason. Also a need exist to ensure that the memory contents of the production microcontroller and the virtual memory are a mirror image of one another. The present invention provides a novel solution to these requirements.

SUMMARY OF THE INVENTION

An embodiment of the present invention provides a user with capability to conduct a lock step consistency check while a debugging process of a microcontroller code is in progress. One embodiment of the present invention provides a host device to copy a production microcontroller, residing on a test circuit, into an in circuit emulation (ICE) system to provide a virtual memory. Another embodiment of the present invention provides the host device to load a microcontroller code comprising of a plurality of lines of code in the production microcontroller and in the virtual microcontroller. Still in another embodiment of the present invention the production microcontroller and the virtual microcontroller execute a line of code of the plurality of lines of code synchronously in accordance with a lock-step process.

According to another embodiment of the present invention, after execution of a line of code of the plurality of lines of code, and before the execution of a next line of code of the plurality of lines of code, a register in the virtual microcontroller retains a first value and a register in the production microcontroller retains a second value. The first value and the second value are the result of synchronous execution of the line of code in the production microcontroller and in the virtual microcontroller respectively. An embodiment of the present invention provides the ICE to receive the first value and compare the first value with the second value. One embodiment of the present invention provides the ICE to halt the debugging process and to issue a "lock-step error", if the comparison of the first value and the second value results in a mismatch. When a "lock-step error" occurs, a user refers to a trace buffer residing in the ICE and identifies the line of code, which caused the "lock-step error" and debugs the line of code accordingly. It is appreciated that ICE does not have access to any data communicated between the test circuit (e.g., a peripheral) and the production microcontroller. The production microcontroller informs the ICE when it receives data from the.

A system and a method for debugging a microcontroller code while debugging process is in progress. A line of code of a plurality of lines of code is executed by a production microcontroller producing a first value. The line of code of the plurality of lines of code is synchronously executed by an ICE and producing the second value. The first value is sent to the ICE. ICE compares the first value and the second value and if the result of the comparison is a mismatch it issues a "lock-step error". When a "lock step error" issues, a user traces a trace buffer, residing in the ICE, and locates the line of code causing the mismatch and debugs the faulty line of code.

These and other objects and advantages of the present invention will no doubt become obvious to those of ordinary skill in the art after having read the following detailed description of the preferred embodiment which are illustrated in the various drawing figures.

BRIEF DESCRIPTION OF THE DRAWINGS

The feature of the invention believed to be novel are set forth with particularity in the appended claims. The invention itself however, both as to organization and method of operation, together with objects and advantages thereof, may be best understood be reference to the following detailed description of the invention, which describes certain exemplary embodiment of the invention, taken in conjunction with the accompanying drawings in which:

Figure 1:
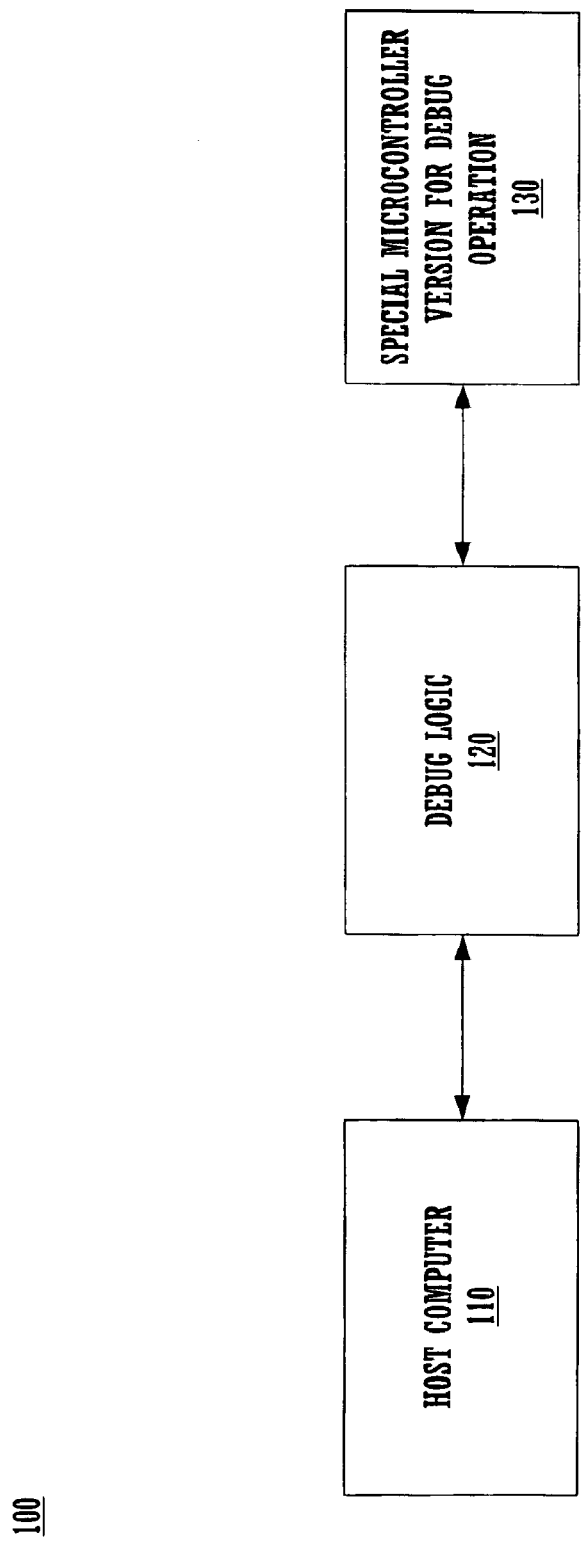
FIG. 1(Prior Art) is a block diagram of a conventional in circuit emulator (ICE).

The accompanying drawings, which are incorporated in and form a part of this specification, illustrate embodiment of the invention and, together with the description, serve to explain the principles of the invention.

DETAILED DESCRIPTION OF THE PREFERRED EMBODIMENTS

Reference will now be made in detail to preferred embodiment of the invention, a system and a method for checking lock-step consistency between an in circuit emulation and a microcontroller while debugging process is in progress, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specified details are set forth in order to provide a thorough understanding of the present invention. However, it will be obvious to one of ordinary skill in the art that the present invention may be practiced without these specific details. In other instances, well known methods, and circuits have not been described in detail as not to unnecessarily obscure aspects of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have been described in detail as not necessarily obscure aspects of the present invention.

Notation And Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey executed steps, logic block, process etc., is here, and generally, convinced to be self consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be born in mind, however, that all of these and similar terms are to be those associated with the appropriate physical quantities and are merely convenient labels applied to those quantities. Unless specifically stated otherwise as apparent from the following discussions, it is appreciated that throughout the present invention, discussion utilizing terms such as "processing" or "transferring" or "executing" or "determining" or "instructing" or "issuing" or "halting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method And System Of TheInvention

While this invention is susceptible of embodiment in many different forms, there is shown in the drawings and will herein be described in detail specific embodiment, with the understanding that the present disclosure is to be considered as an example of the principles of the invention and not intended to limit the invention to the specific embodiment shown and described. In the description below, like reference numerals are used to describe the same, similar or corresponding parts in the several views of the drawings.

A commercial ICE system utilizing the present invention is available from Cypress MicroSystems, Inc., for the CY8C25xxx/26xxx series of microcontrollers. Detailed information regarding this commercial product is available from Cypress MicroSystems, Inc., 22027 17th Avenue SE, Suite 201, Bothell, Wash. 98021, in the form of version 1.11 of "PSOC DESIGNER: Integrated Development Environment User Guide", which is hereby incorporated by reference. While the present invention is described in terms of an ICE system for the above exemplary microcontroller device, the invention is equally applicable to other complex circuitry including microprocessor and other circuitry that is suitable for analysis and debugging using in-circuit emulation. Moreover, the invention is not limited to the exact implementation details of the exemplary embodiment used herein for illustrative purposes.

Figure 2:
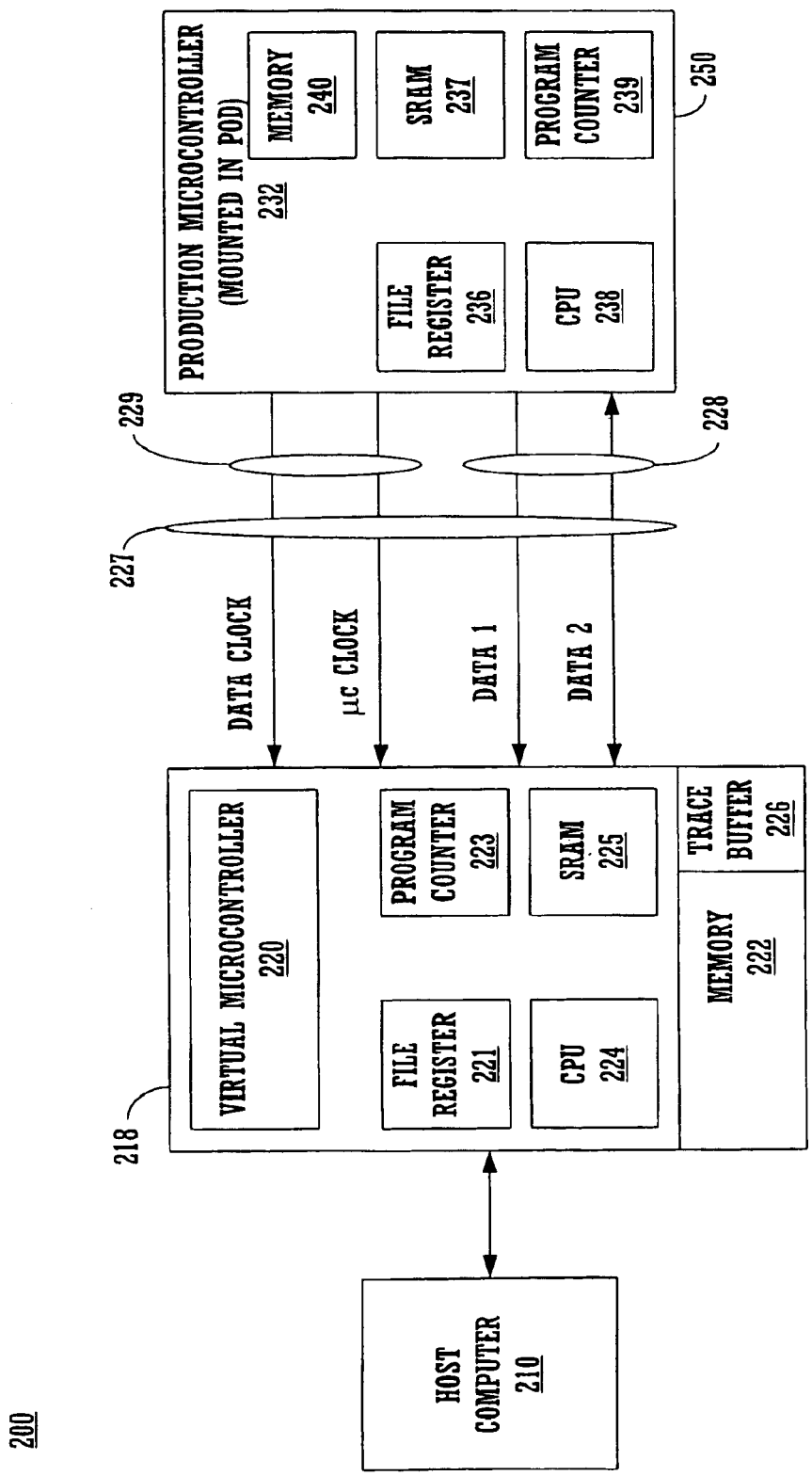
FIG. 2 is a block diagram of an exemplary in circuit emulation system consistent with certain microcontroller embodiments of the present invention.

Referring now to FIG. 2, an architecture for implementation of an embodiment of an ICE system of the present invention is illustrated as system 200. In system 200, a host computer 210 (e.g., a personal computer based on a PENTIUM® class microprocessor) is interconnected (e.g., using a standard PC interface 214 such as a parallel printer port connection, a universal serial port (USB) connection, etc.) with a base station 218. The host computer 210 generally operates to run an ICE computer program to control the emulation process and further operates in the capacity of a logic analyzer to permit a user to view information provided from the base station 218 for use in analyzing and debugging a device under test or development. The device under test 232, mounted on pod 250, comprises file register 236, SRAM 237, CPU 238, program counter 239, and a memory 240.

The base station 218 is based upon a general purpose programmable hardware device such as a gate array configured to function as a functionally equivalent "virtual microcontroller" 220 (or other device under test (DUT)). This is accomplished using an associated integral memory 222 which stores program instructions, data, and other associated information. Base station 218 further including file register 221, program counter 223, CPU 224, and SRAM 225. The base station 218 is configured as an emulator of the internal microprocessor portion of the microcontroller 232. In preferred embodiments, a field programmable gate array FPGA (or other programmable logic device) is configured to function as the virtual microcontroller 220. The FPGA and virtual microcontroller 220 will be referred to interchangeably herein. The base station 218 further includes a trace buffer 226, which stores trace path of the microcontroller code, is coupled (e.g., using a four wire interface 227) to a production microcontroller 232 mounted in a mounting device referred to as a pod 250. Pod 250, in certain embodiments, provides connection to the microcontroller 232 that permit external probing as well as interconnection with other circuitry as might be used to simulate a system under development.

The FPGA of the base station 218 of the current embodiment is designed to emulate the core processor functionality (microprocessor functions, Arithmetic Logic Unit functions, RAM, and ROM memory functions) of the Cypress MicroSystems CY8C25xxx/26xxx series microcontrollers. The CY8C25xxx/26xxx series of microcontrollers also incorporate limited I/O functions and an interrupt controller as well as programmable digital and analog circuitry. This circuitry need not be modeled using the FPGA 220. Instead the I/O read information, interrupt vector and other information can be passed to the FPGA 220 from the microprocessor 232 via interface 227 as will be described later.

The base station 218's virtual microcontroller 220 operates to execute the code programmed into the microcontroller 232 in lock-step operation with the microcontroller 232. Thus, the actual microprocessor 232 is freed of any need to provide significant special facilities for ICE, since any such facilities can be provided in the virtual microcontroller 220. The base station 218's virtual microcontroller 220 and microcontroller 232 execute all steps of the program under test and in lock step without a need to communicate except when a break point or a halt state is encountered. The combination of production and virtual microcontroller behaves just as the microcontroller 232 would alone under normal operation conditions. I/O reads and interrupts vectors are transferred from the microcontroller 232 to the base station 218. Base station 218 is then able to provide the host computer 210 with the I/O reads and interrupts vectors as well as an array of information internal to the microcontroller 232 within memory and register locations that are otherwise inaccessible.

In the designing of a microcontroller or other complex circuit such as the microcontroller 232, it is common to implement the design using the VERILOG® language (or other suitable language). Thus, it is common that the full functional design description of the microcontroller is fully available in a software format. The base station 218 of the current embodiment is based upon the commercially available SPARTAN® series of FPGAs from Xilinx, Inc., 2100 Logic Drive, San Jose, Calif. 95124. The VERILOG® description can be used as the input to the FPGA design and synthesis tool available from the FPGA manufacturer to realize the virtual microcontroller 220 (generally after timing adjustments and other debugging). Thus, design and realization of the FPGA implementation of an emulator for the microcontroller (virtual microcontroller) or other device can be readily achieved by use of a VERILOG description along with circuitry to provide interfacing to the base station and the device under test (DUT).

In the embodiment described in connection with FIG. 2, the actual production microcontroller 232 carries out its normal functions in the intended application and passes I/O information and other information needed for debugging to the base station 218 only at a break point or when in halt state. The virtual microcontroller 220 implemented within the FPGA of base station 218 serves to provide the operator with visibility into the core processor functions that are inaccessible in the production microcontroller 232. Thus, the FPGA, by virtue of operating in lock-step operation with the microprocessor 232 provides an exact duplicate of internal registers, memory contents, interrupt vectors and other useful debug information. Additionally, trace buffer 226 can be used to store information useful in trace operations that is gathered by the FPGA during execution of the program under test. This architecture, therefore, permits the operator to have visibility into the inner working of the microcontroller 232 without need to provide special boundouts and expensive circuitry on the microcontroller itself.

The base station 218's FPGA based virtual microcontroller 220, operating under control of host computer 210, carries out the core processor function of microcontroller 232 and thus contains a functionally exact emulated copy of the contents of the registers and memory of the production microcontroller 232. The ICE system 200 starts both microcontrollers (production 232 and virtual 220) at the same time and keeps them running in synchronization. Whenever the system is halted (i.e., when the system is not emulating), or when system encounters a breakpoint (e.g., sleep, stall, internal start/stop, stalls, etc.) a consistency check may be conducted.

According to lock-step process, execution of a microcontroller code in the base station 218 is a mirror,image of the execution of the microcontroller code is the production microcontroller 232. However, when an outside source of interrupt or when production microcontroller 232 receive an I/O information from the application device the content of registers in production microcontroller 232 and base station 218 are not the same.

The software residing in base station 218 performs a consistency check. Base station 218 verifies the integrity of the lock step process by comparing the contents of the registers in base station 218 and the content of registers in production computer 232. In case of a mismatch between the contents of base station registers and the content of production microcontroller registers, the software residing in base station 218 halts the execution of the microcontroller code and issues a signal indicating a "lock step error".

Another embodiment of the present invention provides a consistency check when a breakpoint is encountered. The virtual microcontroller microcontroller 220 and production microcontroller 232 run a microcontroller code in accordance with a lock-step process. Therefore, both microcontrollers start running at the same time, run the same line of code and stop at the same line of code when encountering a breakpoint. Accordingly, the content of their memory and registers should be the same during the execution of the microcontroller code. In case of a mismatch in the contents of memory or the contents of the registers a user can locate the line of code, causing the inconsistency, and investigate the reason for the mismatch. The user can locate the erroneous line of code by referring to the trace buffer and once the erroneous code is identified the use can debug the line of code accordingly.

For example, when production microcontroller 232 and virtual microcontroller 220 are running a microcontroller code, the execution of the microcontroller code is in accordance with the lock step process. It is also required that before the start of the debugging process all registers in production microcontroller 232 and virtual microcontroller 220 are initially set to zero. Lock step process requires that at any instant virtual microcontroller 220 and production microcontroller 232 execute the same line of code and thus the contents of their registers should hold the same value.

Assume instruction "ADD 1 to accumulator" is the line of code being executed as one step in the course of debugging process. Executing "ADD 1 to accumulator" should result in an increase by "1" to the content of the accumulator in base station 218 and at the same time add "1" to the content of the accumulator in production microcontroller 232. According to an embodiment of the present invention, base station 218 adds "1" to its accumulator and immediately knows the resulting content of its accumulator. On the other hand, production microcontroller 232 adds "1" to the content of its accumulator, simultaneously. Production microcontroller 232, at the end of performing an instruction, sends the result of the operation to base station 218. In this instant, production microcontroller adds "1" to the content of its accumulator and sends the result of the operation to base station 218. Base station 218 compares the content of the accumulator received from production microcontroller 232 against the content of its own accumulator. When the result of the comparison is a mismatch, the software in the base station 218 halts the debugging process and issues a "lock step error".

It is appreciated that under two circumstances base station 218 does not share the same information with production microcontroller 232. The first instance is when production microcontroller receive an I/O data from the test circuit, or the circuit which under normal operation production controller is to control and would receive I/O information. The second instance is when an outside event causes an interrupt in the operation of the production microcontroller. Under these two circumstances, base station 218 will perform the next line of code and conducts the comparison on the next line of instruction.

When a lock step error is detected, the user checks the trace buffer 226. The trace buffer 226 keeps track of each line of codes executed and resides in the base station 218. Examining trace buffer 226 the user can determines which line of code caused the halt. Trace buffer also keeps track of the content of CPU registers on each line of code. The user can back track the execution of each line of code and the associated CPU registers to find the exact line of code where the content of CPU register 238 and the content of CPU register 234 diverge as a result of a faulty code. Once the code is debugged the debugging process will resume. It is appreciated that both CPU register and SRAM on base station 218 and standard microcontroller 232 are initialized with zeros to ensure the integrity of the tracing and the consistency checking.

Similarly, when a break point is encountered, a lock step consistency check may be conducted. The lock-step operation of the microcontroller 232 and the virtual microcontroller 220 requires the virtual microcontroller 220 and standard microcontroller 232 to start running a microcontroller code at the same time, run each line of the microcontroller code at the same time, have the same CPU register content and the same SRAM content on both sides, and to stop at the exactly the same line of code when a breakpoint is encountered. Therefore, at a breakpoint the software in the host device 210 will conduct a consistency check as described above and if there is a mismatch of memory content or SRAM content the host device 210 will issue a "lock step error".

In the embodiment illustrated, the basic interface used is a four line interface between microcontroller 232 and base station 218. This interface permits use of a standard five wires Category Five patch cable to connect the microcontroller 232 and base station 218 In one embodiment, but of course, this is not to be considered limiting. The four wire interface 227 of the present embodiment can be functionally divided into two functional portions. A data transport portion 242 carries two data lines in the current embodiment. A clock portion 246 carries a data clock plus the microcontroller clock signal for the microcontroller 232. Three additional lines are also provided (not shown) for supply, ground and reset line. But, the data transport portion 242 and the clock portion 246 are of primary interest, since the supply and reset functions can be readily provided in any other suitable manner.

The two portions of the interface are implemented in the current embodiment using four lines as described, however, in other embodiments, these two portions can be implemented with as few as two wires. In the current embodiment, the microcontroller clock signal can be varied by programming (even dynamically during execution of a program). Therefore, it is desirable to have two clock signals-microcontroller clock to easily track the microcontroller clock timing as well a system clock that regulates the data transfer and other operations. However, in other embodiments, particularly where a clock frequency is not changed dynamically, a single clock can be used. The single clock can be multiplied or divided as required to implement the required clocking signal.

The present embodiment uses an eight-bit microcontroller that only reads eight bits at a time on any given I/O read. Thus, the present microcontroller 232 needs only to effect serializing and transferring a maximum of one eight bit I/O read for each instruction cycle. This is easily accommodated using two data lines transferring four bits each over four system clock cycles. However, using a clock, which is two times faster, a single line could equally well transfer the data in the same time. Similarly, four lines could be used to transfer the same data in a short enough time to permit the virtual microcontroller 220 to process the data and issue any needed response before the next instruction cycle begins. The time required to accomplish this is held at a minimum in the current invention, since the system synchronization eliminates need for any overhead protocol for transmission of the data.

The present embodiment uses a four line communication interface and method of communication between the FPGA within base station 218 (acting as a "virtual microcontroller" 220 or ICE) and the production microcontroller device under test (microcontroller 232). The four line communication interface is time-dependent so that different information can be transferred at different times over a small number of communication lines. Moreover, since the two processors operate in lock-step, there is no need to provide bus arbitration, framing, or other protocol overhead to effect the communication between the microcontroller 232 and the virtual microcontroller 220. This interface is used for, among other things, transferring of I/O data from the microcontroller 232 to the FPGA 220 (since FPGA emulates only the core processor functions of the microcontroller in the current embodiment). A first interface line (data1) is a data line used by the microcontroller 232 to send I/O data to FPGA based virtual microcontroller 220. This line is also used to notify the FPGA 220 of pending interrupts. This data1 line is only driven by the production microcontroller 232. A second data line (Data2), which is bi-directional, is used by the microcontroller 232 to send I/O data to FPGA based virtual microcontroller of base station 218. In addition, the FPGA 220 uses the Data2 line to convey halt requests (i.e., to implement simple or complex breakpoints) to the microcontroller 232.

A third interface line is a 24/48 Mhz data clock used to drive the virtual microcontroller 220's communication state machines (the logic used within the state controller to communicate with the microcontroller 232). In the current embodiment, this clock always runs at 24 Mhz unless the microcontroller 232's internal clock is running at 24 Mhz. In this case the system clock switches to 48 Mhz. Of course, these exact clock speeds are not to be considered limiting, but are presented as illustrative of the current exemplary embodiment. The fourth interface line is the internal microcontroller clock from the microcontroller 232.

A fifth line can be used to provide a system reset signal to effect the simultaneous startup of both microcontrollers. This fifth line provides a convenient mechanism to reset the microcontrollers, but in most environments, the simultaneous startup can also be effected in other ways including switching of power. Sixth and seventh lines are provided in the current interface to provide power and ground for power supply The base station 218's virtual microcontroller 220 communicates with the microcontroller 232 via four signal and clock lines forming a part of the four line interface 227 forming a part of a seven wire connection as described below. The interface signals travel over a short (e.g., one foot) of CAT 5 network cable. The ICE transmits break commands to the microcontroller 232 via the base station 218, along with register read/write command when the microcontroller 232 is halted. The microcontroller 232 uses the interface to return register information when halted, and to send I/O read, interrupt, vector, and watchdog information while running. The microcontroller 232 also sends a copy of its internal clocks for the ICE.

Synchronization between the microcontroller 232 and the virtual microcontroller 220 is achieved by virtue of their virtually identical operation. They are both started simultaneously by a power on or reset signal. They then track each other's operation continuously executing the same instructions using the same clocking signals. The system clock signal and the microcontroller clock signal are shared between the two microcontrollers (production and virtual) so that even if the microprocessor clock is changed during operation, they remain in lock step.

In accordance with certain embodiment of the invention, a mechanism is provided for allowing the FPGA 220 of base station 218 and the microcontroller 232 to stop at the same instruction in response to a break-point event (a break or halt). The FPGA 220 has the ability to monitor the microcontroller states of microcontroller 232 for a breakpoint event, due to its lock-step operation with microcontroller 232. In the process of executing an instruction, an internal start of instruction cycle (SOI) signal is generated (by both microcontrollers) that indicates that the device is about to execute a next instruction. If a break point signal (a halt or break signal—the term "halt" and "break" are used synonymously herein) is generated by the FPGA, the execution of the microcontroller 232 can be stopped at the SOI signal point before the next instruction starts.

Figure 3:
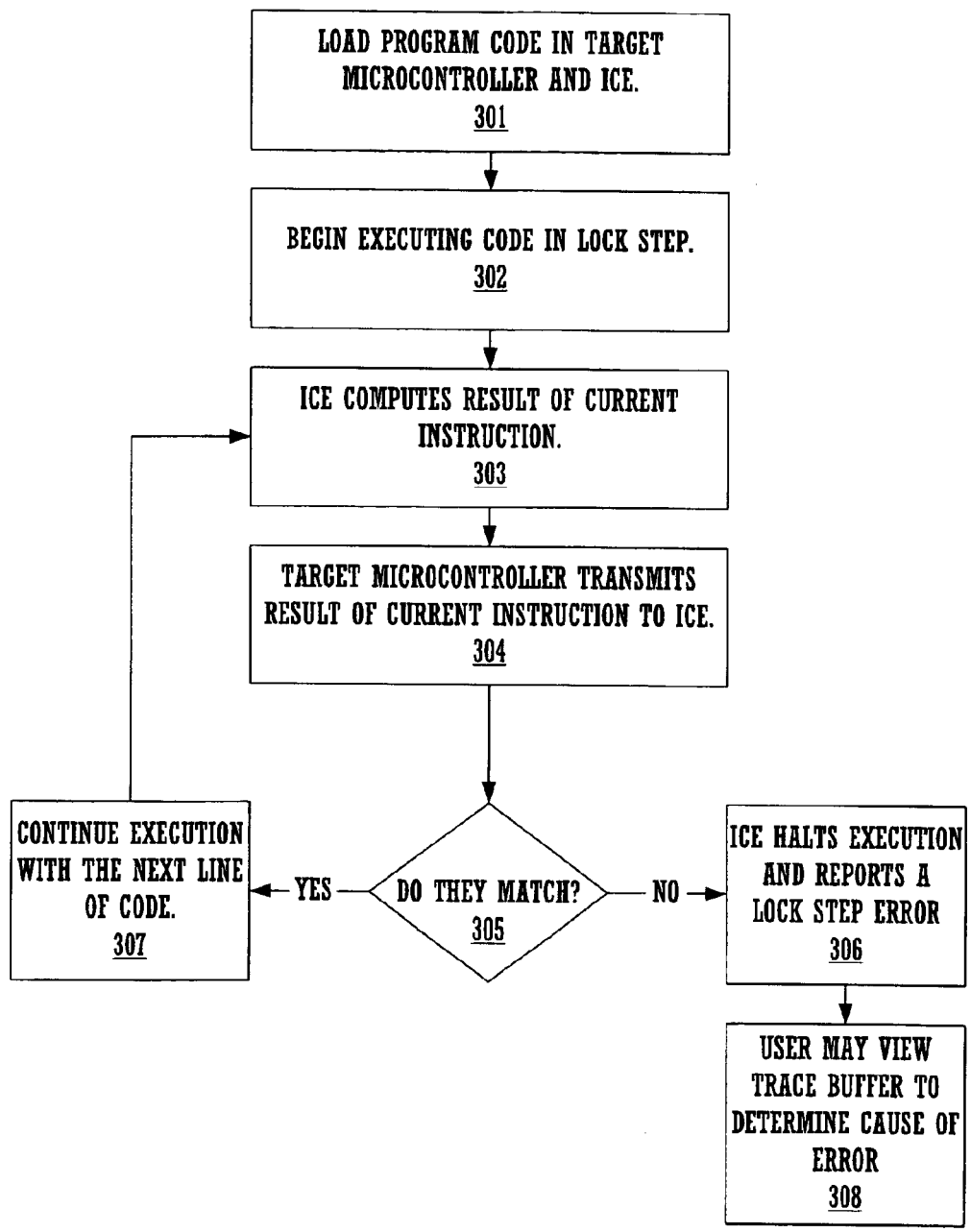
FIG. 3 is an illustration of checking the consistency of lock step execution of a debugging process at a halt state.

FIG. 3 is a flow chart of the steps of a microcontroller code debugging process 300 in accordance with one embodiment of the present invention. As depicted in FIG. 3, process 300 shows the steps involved in debugging microcontroller code using a lock step execution ICE system (e.g., system 200 of FIG. 2).

Process 300 begins in step 301 where microcontroller program code is loaded into a target microcontroller and an ICE. As described above, the debugging process begins by initializing a first memory of the ICE and a second memory of the microcontroller with microcontroller test code. This test code typically comprises a microcontroller application requiring testing with multiple microcontroller configurations, settings, conditions, and the like. In step 302, code execution subsequently begins with the code being executed on both the microcontroller (e.g., the target microcontroller) and the ICE in lock step. In step 303, during code execution, the ICE computes the result of a current instruction (e.g., ADD, SUBTRACT, MOVE, etc.). In step 304, also during code execution, the microcontroller computes the result of the current instruction and transmits the result to the ICE.

In step 305, lock step execution of the microcontroller test code is verified by comparing the current instruction result from the ICE with the current instruction result received from the microcontroller. If the current instruction results match, lock step execution is verified and process 300 proceeds to step 307. If the current instruction results do not match, lock step execution is not verified and process 300 proceeds to step 306. In step 307, microcontroller code execution continues with the next line of code being executed and process 300 proceeding to step 303. In step 306, where lock step execution is not verified, the ICE halts the execution and reports a lock step error. Subsequently, in step 308, the user may view an execution history of the most recently executed lines of code in a trace buffer to determine a cause of the error.

The foregoing descriptions of specific embodiments of the present invention have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for check consistency of a lock-step process comprising:
   a production microcontroller installed on a test circuit, the production microcontroller running a microcontroller code and producing a first value;
   an ICE (in circuit emulator) coupled to a host device, wherein the ICE emulates the production microcontroller to form a virtual microcontroller, the virtual microcontroller running the microcontroller code simultaneously with the production microcontroller and producing a second value; and
   an interface for coupling the production microcontroller and the ICE enabling transmission of the first value to the ICE, where the production microcontroller sends to the ICE a result of an execution of a line of code, and wherein the ICE compares the first value against the second value.

2. A system for checking consistency of a lock-step process as recited in claim 1 wherein the production microcontroller is installed on a pod.

3. A system for checking consistency of a lock-step process as recited in claim 1 wherein the production microcontroller is substantially copied in a field programmable gate array (FPGA) in the ICE.

4. A system for checking consistency of a lock-step process as recited in claim 1 where the ICE ignores execution of the microcontroller code if the microcontroller code executed by the virtual microcontroller is an I/O instruction.

5. A system for checking consistency of a lock-step process as recited in claim 1 where the ICE ignores execution of the microcontroller code if there is an interrupt in operation of the production microcontroller.

6. A system for checking consistency of a lock-step process as recited in claim 1 wherein the ICE stores the second value for comparison with the first value received from the production microcontroller.

7. A system for checking consistency of a lock-step process as recited in claim 1 wherein the ICE sends an error signal when the first value and the second value are inconsistent.

8. A system for checking consistency of a lock-step process as recited in claim 1 wherein the ICE independently detects inconsistency in the first value and the second value when there is an interrupt in operation of the production microcontroller.

9. A system for checking consistency of a lock-step process as recited in claim 1 wherein the production microcontroller receives data from a test circuit.

10. A system for checking consistency of a lock-step process as recited in claim 1 wherein the production microcontroller receives data from a product controlled by the production microcontroller.

11. A system for checking consistency of a lock-step process as recited in claim 1 wherein the production microcontroller provides the ICE with I/O read information sent by the test circuit.

12. A system for checking consistency of a lock-step process as recited in claim 1 wherein the production microcontroller provides the ICE with I/O read information sent by a product controlled by the production microcontroller.

13. A system for checking consistency of a lock-step process as recited in claim 1, wherein the ICE compares the first and the second values and where there is inconsistency a software residing in the ICE halts the execution of the microcontroller code and issues an error signal.

14. A method for verifying lock step microcontroller code execution in a code debugging process comprising:
   a) initializing a first memory of an ICE (in circuit emulator) and a second memory of a microcontroller with microcontroller test code;
   b) executing the microcontroller test code on the microcontroller and on the ICE in lock step;
   c) computing an ICE current instruction result and a microcontroller current instruction result;
   d) verifying lock step execution by comparing the ICE current instruction result and the microcontroller current instruction result;
   d) if lock step execution is not verified, halting the execution of the microcontroller test code and reporting an error; and
   e) if lock step execution is verified, continuing execution of the microcontroller test code.

15. The method of claim 14 further comprising:
   if lock step execution is not verified, saving an execution history using a trace buffer coupled to the ICE.

16. The method of claim 14 further comprising:
   transmitting the microcontroller current instruction result from the microcontroller to the ICE for verifying the lock step execution.

17. The method of claim 14 wherein the ICE ignores execution of an instruction if the instruction is an I/O instruction.

18. The method of claim 14 wherein the ICE ignores execution of an instruction if the instruction is an interrupt.

19. The method of claim 14 wherein the ICE independently detects inconsistency between the ICE current instruction result and the microcontroller current instruction result when the execution of the microcontroller test code is halted.

20. A lock step code execution microcontroller testing system comprising:
   a microcontroller installed on a test circuit, the microcontroller running microcontroller code, the microcontroller installed on a pod;
   an ICE (in circuit emulator) coupled to a host device, wherein the ICE emulates the microcontroller using a field programmable gate array (FPGA) in the ICE, the ICE running the microcontroller code simultaneously with the microcontroller; and
   an interface for coupling the microcontroller and the ICE enabling data transmission between the ICE and the microcontroller, wherein the ICE compares a microcontroller execution result with an ICE execution result to verify lock step microcontroller code execution.

21. The system of claim 20 wherein the ICE ignores execution of the microcontroller code if the microcontroller code executed by the microcontroller is an I/O instruction.

22. The system of claim 20 wherein the ICE ignores execution of the microcontroller code if the microcontroller code is an interrupt instruction.

23. The system of claim 20 wherein the ICE independently detects inconsistency between the microcontroller execution result and the ICE execution result when there is a halt in the operation of the microcontroller.

24. The system of claim 20 wherein the microcontroller is coupled to receive data from a product controlled by the microcontroller.

25. The system of claim 20 wherein the microcontroller provides the ICE with I/O read information sent by a product controlled by the microcontroller.

* * * * *